United States Patent [19]

Canevari

[11] 4,235,743
[45] Nov. 25, 1980

[54] COMPOSITION AND METHOD FOR SUPPRESSING VAPOR LOSS OF VOLATILE HYDROCARBONS

[75] Inventor: Gerard P. Canevari, Cranford, N.J.

[73] Assignee: Exxon Research & Engineering Co., Florham Park, N.J.

[21] Appl. No.: 838,246

[22] Filed: Sep. 30, 1977

Related U.S. Application Data

[63] Continuation-in-part of Ser. No. 702,692, Jul. 6, 1976.

[51] Int. Cl.² .................................................. C09K 3/00
[52] U.S. Cl. ..................................... 252/382; 252/351; 252/384; 422/42
[58] Field of Search ................. 21/60.5 A; 252/356, 252/351, 384, 382

[56] References Cited

U.S. PATENT DOCUMENTS

| | | | |
|---|---|---|---|
| 3,772,195 | 11/1973 | Francen | 252/356 |
| 3,883,512 | 9/1974 | Prokai et al. | 252/356 |

*Primary Examiner*—Benjamin R. Padgett
*Assistant Examiner*—J. L. Barr
*Attorney, Agent, or Firm*—Joseph J. Dvorak

[57] ABSTRACT

A very effective composition for inhibiting vapor losses of stored hydrocarbons comprises a mixture of a fluorosurfactant, a silicone surfactant, a polyglycol, and a glycol ether. Indeed, a method for retarding evaporation of volatile hydrocarbons from a body of liquid hydrocarbon material is provided by forming a thin film of these compositions on the surface of the body of liquid hydrocarbons.

12 Claims, 6 Drawing Figures

COMPOSITION AND METHOD FOR SUPPRESSING VAPOR LOSS OF VOLATILE HYDROCARBONS

CROSS REFERENCE TO RELATED APPLICATIONS

This application is a continuation-in-part of Application Ser. No. 702,692, filed July 6, 1976.

BACKGROUND OF THE INVENTION

1. Field of the Invention

This invention relates to techniques for minimizing the evaporative losses of stored hydrocarbons. In particular, the present invention is concerned with suppressing the volatilization of hydrocarbons contained in petroleum products such as crude oil.

2. Background of the Invention

In the past, petroleum products, particularly crude oil, have been relatively inexpensive commodities. In very recent years, however, increased world demand for all natural resources has significantly altered the prior supply/demand relationships so that losses of hydrocarbons from evaporation is deemed quite serious from an economic point of view. Moreoever, there is a concern for preserving not only petroleum hydrocarbons but all volatile liquids.

Important also is the need to protect the environment from contamination by volatile hydrocarbons. Indeed, increased world use of petroleum products has increased the needs for improvements in suppressing the loss of hydrocarbons into the atmosphere, etc.

In the description to follow, reference will be made primarily to suppressing the loss of hydrocarbons by vaporization from crude oils; however, it is to be understood that crude oil is merely one example of a hydrocarbon which contains sufficient amounts of volatile components which will undergo vaporization in substantial amounts during storage.

As will be appreciated, crude oil contains a very wide spectrum of hydrocarbons ranging from those which have very high boiling points to those which would exist in the vapor state if they were isolated. Indeed, it is the presence of these latter materials that contributes to the significant vapor pressure of crude oil.

There have been a number of techniques suggested in the past for inhibiting the vaporization of hydrocarbons. For example, in U.S. Pat. No. 1,985,491, it is suggested that a fatty acid soap be mixed with water and then beat into a froth with a vigorous air blast. The froth, thereafter, is spread on the surface of oil, so as to minimize evaporation and oxidation of the oil.

In U.S. Pat. No. 2,822,238, evaporation of volatile nonaqueous liquid products is retarded by floating small hollow particles, wet by water, on the surface of the volatile liquid.

In U.S. Pat. No. 2,907,627, a technique is disclosed for inhibiting vapor loss by spreading a synthetic resin plastic such as a polyurethane on the surface of the crude petroleum. In contrast thereto, U.S. Pat. No. 3,421,838 discloses the use of rubber cement as a vapor barrier for volatile petroleum products.

Other techniques suggested for inhibiting vaporization of hydrocarbon materials include the use of a gelling material to create an integral roof on an oil tank. In this regard, see U.S. Pat. No. 3,639,258. Mention should be made also of the technique of preventing hydrocarbon losses during the loading of vessels by use of an aqueous foam which is stable during the period corresponding to that required for loading. For this technique, see U.S. Pat. No. 3,850,206. The last two techniques for inhibiting vaporization of hydrocarbons have more limited applicability than the above-mentioned techniques.

In U.S. Application Ser. No. 702,692, filed July 6, 1976, and incorporated herein by reference, there is disclosed a very effective composition for inhibiting vapor losses of stored hydrocarbons which comprises a mixture of a surfactant and a polyglycol. This composition, when applied to the surface of a body of hydrocarbon liquid, forms an effective film type barrier thereby reducing vapor loss. Notwithstanding the significant utility of such composition in reducing vapor loss of hydrocarbons, the search for even more effective and more economic techniques for conserving natural resources and protecting the environment continue.

SUMMARY OF THE INVENTION

According to the present invention, there is provided an improved evaporation retarding mixture capable of forming a continuous stable film over the surface of a body of liquid hydrocarbon material comprising a fluorosurfactant, a silicone surfactant, a polyglycol and a glycol ether.

In general, the fluorosurfactant employed in the composition of the present invention is a fluorinated surfactant which is substantially hydrocarbon insoluble. It must be a material which has the ability to pack tightly and to orient itself perpendicularly to the surface of the liquid hydrocarbon material being treated. Finally, the fluorosurfactant is one having a fluorocarbon moiety containing from about 7 to about 16 carbon atoms. Preferably the fluorocarbon moiety will be linear.

The silicone surfactant is an organo substituted silicone fluid selected from the group consisting of alkyl, aryl and aralkyl polysiloxanes and copolymers of such organo polysiloxanes with polyethers such as polyethylene oxide, polyethylene oxide-polypropylene oxide copolymers, and the like. Preferably the silicone surfactant is a copolymer of a polysiloxane with a polyalkylene oxide copolymer.

The polyglycol is selected from a wide range of liquid polyhydroxy alkanes including polyethylene glycols, polypropylene glycols, and the like. Preferably the polyglycol is polyethylene glycol having a gram molecular weight of about 400.

The glycol ether employed is selected from a wide range of primary alcohols of linear alkoxy alkanes. Preferred is 1-hydroxy-2-butoxy ethane.

In general, the combined fluorosurfactant and silicone surfactant will represent from about 10% to about 40%, and preferably 30%, of the composition. Indeed, the amounts of the constituents of the composition of the invention, with percentages by weight, are as follows:

(a) about 5 to about 20% fluorosurfactant
(b) about 5 to about 10% silicone surfactant
(c) about 5 to about 35% polyglycol
(d) about 5 to about 35% glycol ether

DETAILED DESCRIPTION OF THE INVENTION

Figure 1:
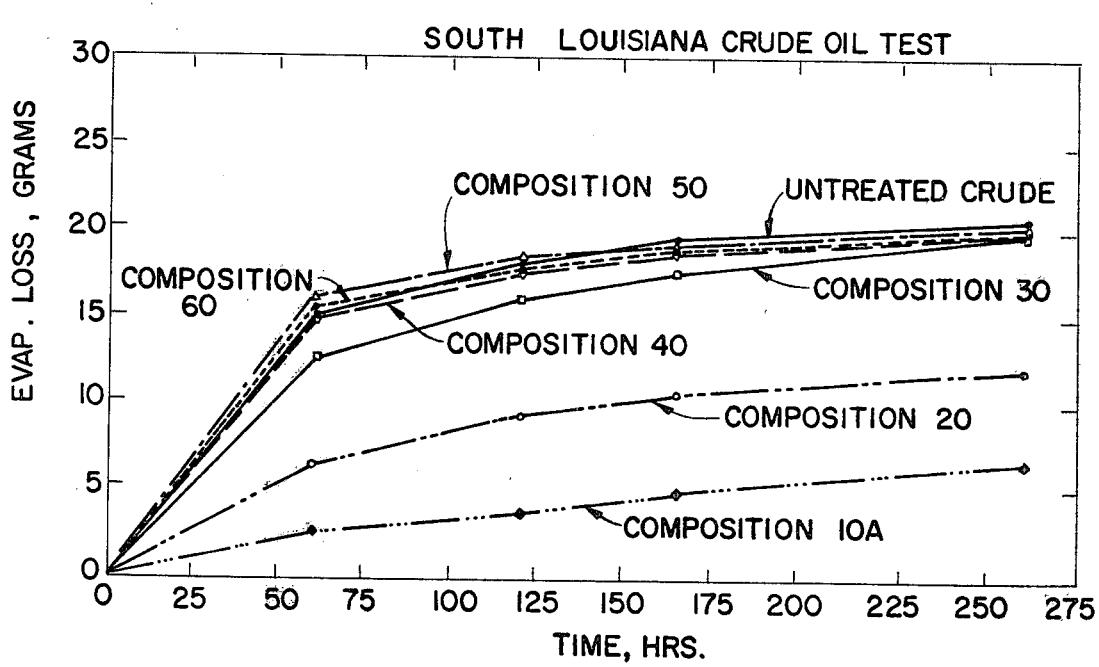
FIG. 1 is a graphic representation comparing the evaporation loss of an untreated Southern Louisiana crude oil with samples of the same crude treated in accordance with the invention, the fluorosurfactant being varied in each test run.

As indicated hereinabove, the present invention is concerned generally with suppressing hydrocarbon vapor loss from a body of the hydrocarbon liquid by forming a continuous stable film of a barrier layer over to the surface of the body of liquid hydrocarbon. In the detailed description which follows, however, specific reference will be made to preventing loss of volatile hydrocarbon compounds from crude oil although the present invention is applicable to a wide range of volatile organic materials in addition to crude oils. Indeed, among the numerous hydrocarbon materials, the vaporization of which can be suppressed in accordance with the present invention, are liquid aliphatic hydrocarbons, liquid alicyclic hydrocarbons, liquid aromatic hydrocarbons and mixtures of these. Specific examples of volatile hydrocarbons, the vaporization of which can be substantially suppressed in accordance with the present invention, include gasolines, heptanes, cyclohexanes, benzene, pyridene and the like. The foregoing recitation of these hydrocarbon materials that can be effectively treated in accordance with the present invention is not intended to be limiting, but merely exemplary of the wide applicability of the present invention.

Generally speaking, hydrocarbon losses by vaporization are substantially reduced in accordance with the practice of the present invention by forming a continuous stable film over the surface of a body of liquid hydrocarbon which operates as a barrier to vapor loss. It has now been found that excellent evaporation retarding compositions for such purposes comprise a fluorosurfactant, a silicone surfactant, a polyglycol and a glycol ether. In general, the surfactants, i.e. the fluorosurfactant and silicone surfactant, will represent from about 10 wt. % to about 40 wt. %, and preferably about 30%, of the composition. The amounts of the components of the evaporation retarding composition will be discussed hereinafter in greater detail.

Concerning the nature of the components, the fluorosurfactant of the retarding mixtures according to the present invention are characterized by the following criteria. First, the fluorosurfactant must be insoluble in the particular liquid hydrocarbon body being treated. Second, the fluorosurfactant must have the ability to pack tightly and to orient itself perpendicularly to the surface of the liquid hydrocarbon body. Third, the fluorosurfactant, to have sufficient resistance to hydrocarbon transfer from the surface of the liquid hydrocarbon body, must have fluorocarbon chain or moiety greater than about 7 carbon atoms, and more typically will have fluorocarbon moieties containing about 8 to about 16 carbon atoms. Preferably the fluorocarbon moieties will be linear chains of from about 8 to about 16 carbon atoms.

It will be appreciated by those skilled in the art that surfactants are generally classed as organic molecules containing both hydrophobic and hydrophilic groups in an organic molecule. Surfactants are further classified as being strong wetting agents or as strong detergents. In the case of strong wetting agents, the hydrophilic group tends to be in the middle of the molecule. In contrast thereto, in strong detergents the hydrophilic group is at the end of a hydrophobic group. Indeed, the hydrophobic group tends to be a linear hydrocarbon. In accordance with the practice of the present invention, the fluorosurfactants that are satisfactory have fluoroalkanes as a hydrophobic group. These fluorosurfactants can be anionic, cationic, nonionic and amphoteric.

Many of the foregoing fluorosurfactants are available commercially. Consequently, it is one of the advantages of the present invention that commercially available fluorosurfactants can be used. Such fluorosurfactants include the fluorosurfactants sold under the trademark "Monflor" by ICI United States, Inc., Wilmington, Delaware and that sold under the trademark "Zonyl" by duPont, Wilmington, Delaware.

The silicone surfactant employed in this invention is an organo substituted silicone fluid or liquid polysiloxane. While not wishing to be bound by any theory, it is believed that the polysiloxane contributes to the spreading of the composition on the hydrocarbon surface. Additionally, it is believed that the polysiloxane enhances molecular packing. In any event, the polysiloxane is selected from alkyl, aryl and aralkyl polysiloxanes and copolymers of alkyl, aryl and aralkyl polysiloxanes with polyethers having linear aliphatic groups of from 4 to 6 carbon atoms, and copolymers of such polyethers. Particularly preferred are the block copolymers of lower dialkyl polysiloxanes, i.e. having from 1 to 4 carbon atoms in a linear aliphatic group, and copolymers of ethylene and propylene oxide. Especially preferred is a copolymer of dimethyl polysiloxane and polyethylene oxide-polypropylene oxide copolymer.

Just as with the fluorosurfactants, these silicone fluids are commercially available and mention, by way of example, is made herein to the silicone fluids designated SF-96, SF-1075, SF-1066 and the like sold by General Electric Company, New York, NY.

The polyols suitable in the practice of the present invention include liquid ethylene glycols such as triethylene glycol, polypropylene glycol and polyethylene glycol. Generally, the glycol is one which has a molecular weight in the range of about 100 to 1200 and preferably about 400. The preferred polyglycol is polyethylene glycol having a molecular weight of about 400.

The glycol ethers suitable in the practice of the subject invention include a wide range of primary alcohols of linear alkoxy alkanes. Indeed, the alkoxy alkanes may be symmetrical or asymmetrical compounds having generally from about 6 to 10 carbon atoms. Particularly preferred are the 1-hydroxy-2-alkoxy ethanes and especially 1-hydroxy-2-butoxy ethane.

In order to effectively inhibit the vaporization of hydrocarbons from a body of liquid hydrocarbon materials, it is necessary that the evaporation retarding mixture form a continuous stable film over the surface of the body of liquid hydrocarbon material. While not wishing to be bound by any theory, the polyethylene glycol and glycol ether components of the evaporative retarding mixtures of the present invention apparently associate with the hydrophilic portion of the surfactant through weak van der Waal forces thereby improving the impermeability of the film. A limited lamella of the glycol is supported by surface forces. By association with the hydrophilic moiety of the surfactant package, a sandwich-like molecular configuration results.

In any event, it has been discovered that the addition of both the polyethylene glycol and the glycol ether to the foregoing above-mentioned surfactants provides an effective evaporation retarding mixture which is capable of forming a continuous stable film over the surface of a body of liquid hydrocarbon material.

The amounts of the constituents of the composition of the invention, with percentages by weight, are as follows:

(a) 5 to 20% fluorosurfactant
(b) 5 to 10% silicon surfactant
(c) 5 to 35% polyglycol
(d) 5 to 35% glycol ether Preferred compositions comprise:

(a) 5 to 20% of an amphoteric fluorosurfactant represented by the general formula $$NH_4^+ +F_3CCF_2CF_2+_3COO^-$$

and having a gram molecular weight of about 550;

(b) 5 to 10% of a silicone fluid, especially a copolymer of dimethyl polysiloxane and polyethylene-polypropylene oxide copolymer and having a gram average molecular weight of about 7000;

(c) 5 to 35% polyethylene glycol having a molecular weight of about 400; and (d) 5 to 35% of a glycol ether having from about 6 to 10 carbon atoms in the compound.

In applying the evaporation retarding mixture to the surface of a liquid hydrocarbon body, the mixture may be spread over the surface of the liquid hydrocarbon body by a convenient means. In the practice of the present invention, it is particularly preferred, however, that the evaporation retarding mixture be applied to the hydrocarbon body as a fine aerosol spray. Application in the form of a fine aerosol spray tends to more effectively utilize the material in film forming and minimizes the amount which may sink through the liquid hydrocarbon.

The amount of evaporation retarding material applied to the surface of the liquid hydrocarbon bodies is not critical. It can be applied in almost any manner sufficient to form a continuous thin film of the evaporation retarding mixture on the surface of the liquid hydrocarbon body. For most effective retardation of evaporation, however, the mixture will be applied in amounts sufficient to provide a film thickness greater than 70 monolayers and preferably in an amount ranging from about 210 to 350 monolayers. Thus, it will be readily appreciated by persons skilled in the art that the amount of material needed to form an effective barrier is relatively very small. Indeed, to form a film thickness of approximately 350 monolayers on the cargo of a 90,000 ton tanker, only about 3½ gallons of the evaporative retarding mixture would be required.

The unique features of certain aspects of the present invention are brought out in the following examples which are strictly illustrative and not to be construed as limiting in scope.

EXAMPLE 1

A series of tests was conducted using an open beaker that had a diameter of 3⅛ inches. Some beakers were charged solely with a Southern Louisiana crude oil. Other beakers were charged with the Southern Louisiana crude oil and were sprayed by means of an aerosol spray for about 5 seconds each with an evaporation retarding mixture. The amount of spray was sufficient to apply an estimated 350 to 1000 monolayers of evaporation retardant mixture on the crude oil. The amount of hydrocarbon loss was determined over a period of time. The results from the tests are set forth graphically in FIG. 1. In each of the tests the composition was maintained at 35 wt. % polyethylene glycol having a molecular weight of about 400, 35% of 1-hydroxy-2-butoxy ethane and 10% of a fluid silicone surfactant sold by General Electric Company under the trademark SF-1066 and 20% of a fluorosurfactant. In each of the tests, a different type fluorosurfactant was employed. The type of fluorosurfactant is described generally in Table I.

TABLE I

| TYPE OF FLUOROCARBON SURFACTANTS IN VAPOR RETARDANT COMPOSITIONS | | | | |
|---|---|---|---|---|
| | | Type of Fluorosurfactant Used | | |
| Composition No. | Trade Name | Manufacturer | Ionic Type | Comments |
| 10A | Zonyl FSB | DuPont | Amphoteric | Fluoroalkyl ($F_3CCF_2CF_2$...) with 7-8 carbon chain. Cationic group is $NH^+$. Anionic group is $COO^-$. Mol wt. = 550. |
| 20 | Zonyl FSC | DuPont | Cationic | Fluoroalkyl ($F_3CCF_2CF_2$...) carbon chain with cationic group. |
| 30 | Zonyl FSP | DuPOnt | Anionic | Fluoroalkyl ($F_3CCF_2CF_2$...) carbon chain with anionic group. |
| 40 | Monflor 31 | ICI United States, Inc. | Anionic | Highly branched as opposed to conventional straight chain. Ionic polymerization of $(C_2F_4)_n$ yields low m.w. intermediate. |
| 50 | Monflor 51 | ICI United States, Inc. | Nonionic | Highly branched as opposed to conventional straight chain. Ionic polymerization of $(C_2F_4)_n$ yields low m.w. intermediate. |
| 60 | Monflor 72 | ICI United States, Inc. | Cationic | Highly branched as opposed to conventional straight chain. Ionic polymerization of $(C_2F_4)_n$ |

| | | TABLE I-continued | | |
|---|---|---|---|---|
| TYPE OF FLUOROCARBON SURFACTANTS IN VAPOR RETARDANT COMPOSITIONS | | | | |
| | | Type of Fluorosurfactant Used | | |
| Composition No. | Trade Name | Manufacturer | Ionic Type | Comments |
| | | | | yields low m.w. intermediate. |

EXAMPLE 2

Figure 2:
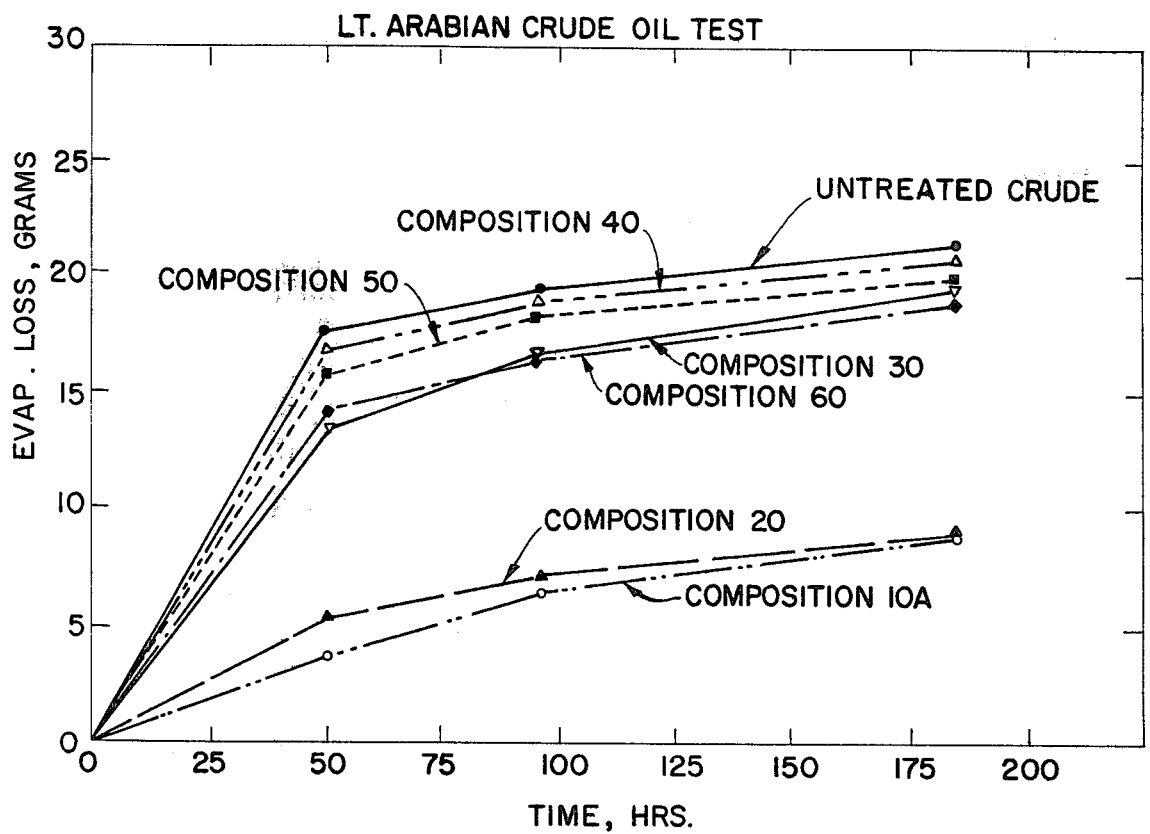
FIG. 2 is a graphic representation comparing the results of tests similar to that shown in FIG. 1 but using a light Arabian crude oil.

The procedure of Example 1 was followed except that the hydrocarbon treated was a light Arabian crude oil. The results of such tests are shown graphically in FIG. 2. Also, the fluorosurfactants, identified by number in FIG. 2, are described generally in Table I.

EXAMPLE 3

Figure 3:
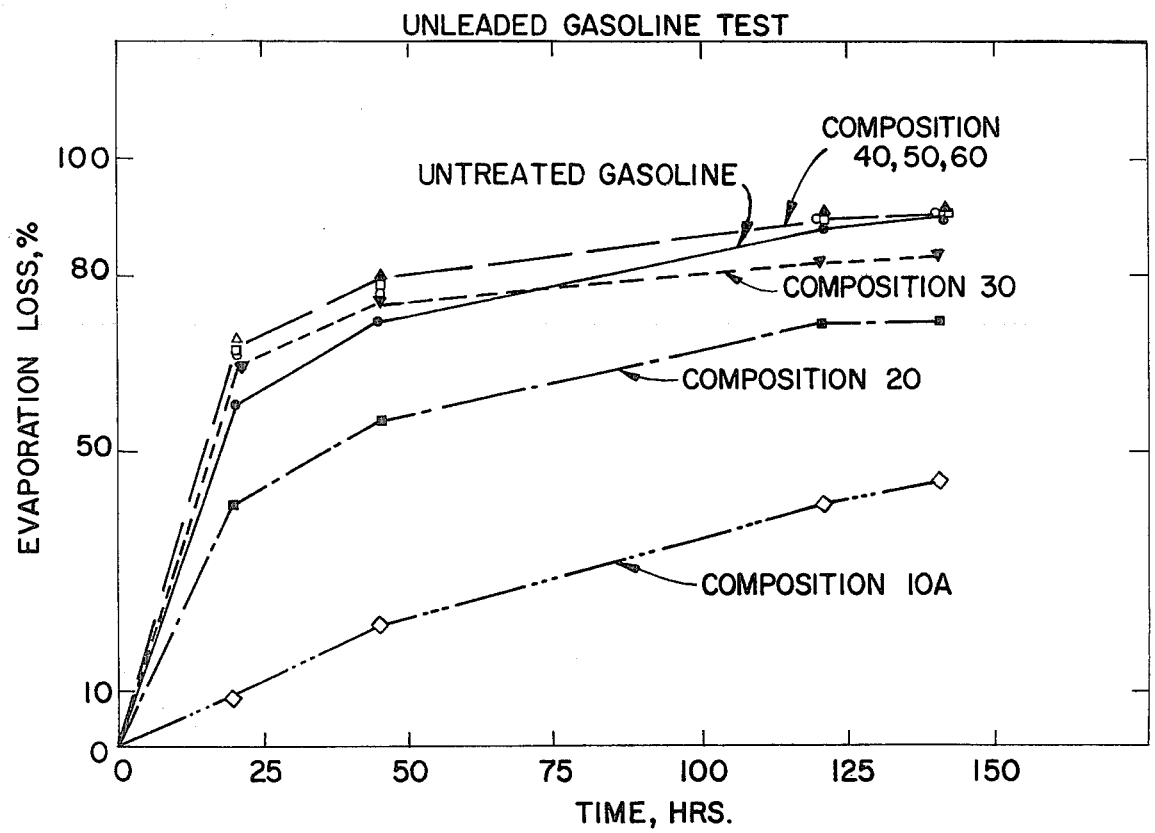
FIG. 3 is a graphic representation comparing results of tests similar to that shown in FIG. 1, but using unleaded gasoline.

The procedure of Example 1 was followed except that the beakers were charged with a commercially available unleaded gasoline. The results of these tests are set forth in FIG. 3, the fluorosurfactant numbers of FIG. 3 being keyed to the general descriptions in Table 1. As can be seen in the foregoing tests, linear fluorosurfactants are more effective components of evaporation retarding mixtures than their branched counterparts and consequently fluorosurfactants are particularly preferred.

EXAMPLE 4

Figure 4:
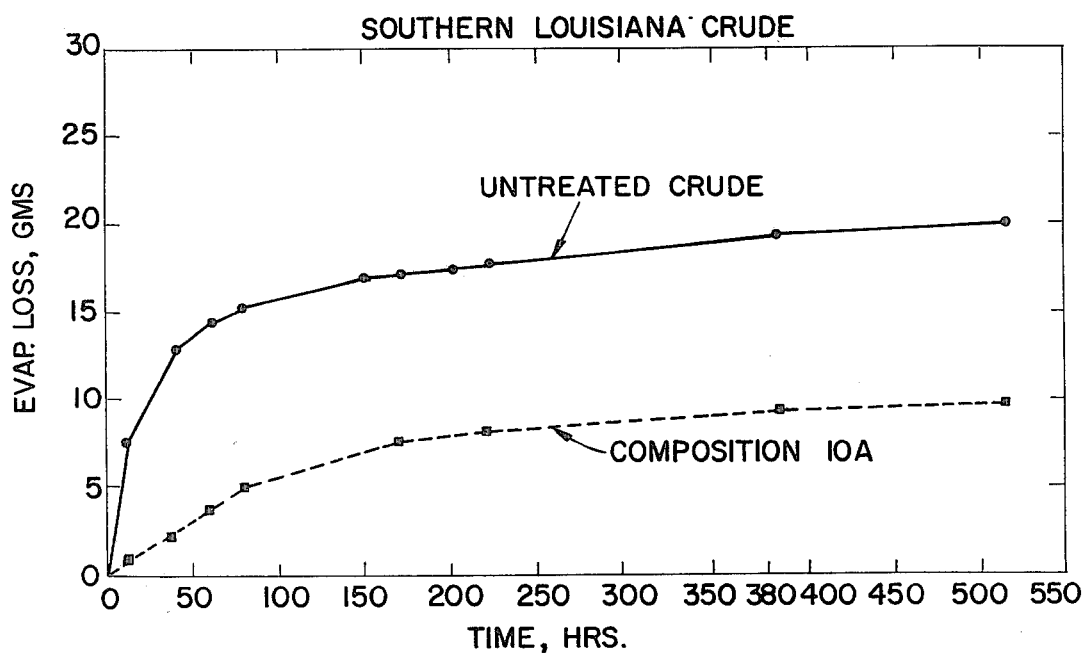
FIG. 4 is a graphic representation comparing the evaporation loss of an untreated Southern Louisiana crude oil with a sample of the same crude treated in accordance with this invention, both samples being subjected to periodic tilting.

In this example, a number of samples of Southern Louisiana crude oil were placed in open 100 ml beakers. In some of these beakers, the crude oil was coated with a 35% polyethylene glycol, 35% 1-hydroxy-2-butoxy ethane, 10% GE silicone SF-1066 and 20% Zonyl FSB fluorocarbon. Untreated crude oil served as a control. The beakers were arranged on a platform which could be inclined at 30°. After so arranging the beakers and coating all but the controls with the vapor retardant mixture, the platform was tilted in one direction. Thereafter, three times in every 24 hour period the platform was tilted in the opposite direction. This imparted an increase and decrease, or flexing, of the surface coating. The results of this test are depicted in FIG. 4.

EXAMPLE 5

Figure 5:
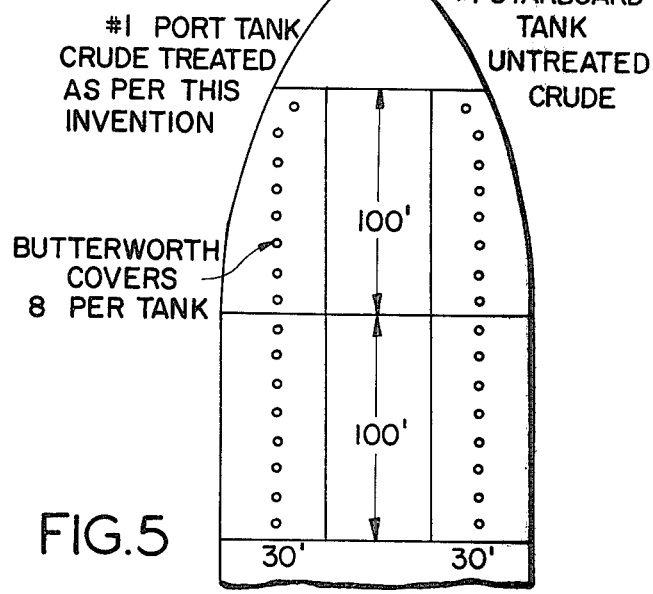
FIG. 5 is a schematic diagram of a portion of a commercial tanker showing the relative position of two tanks used in the field test of an evaporation retarding mixture according to this invention.

A field test was conducted during the unloading of light Arabian crude oil from a commercial tanker. The arrangement of the cargo compartment selected for the purpose of the test is shown in FIG. 5. Before discharge commenced, two liters of an evaporation retarding mixture having the composition set forth in Example 4 were sprayed onto the surface of the crude oil in the #1 port wing tank. In order to assure optimum distribution of the vapor retardant composition, all the tank covers were removed one at a time for a period not exceeding 60 seconds. The ullage at the time of distribution was only 2 feet, making it difficult, however, to deliver the chemical composition to the low surface at some locations because of the interference of structural members in the tank. The #1 starboard wing tank was utilized as a control for a comparative purpose and hence the crude oil therein was not treated with any evaporation retarding composition. After application of the vapor retardant composition in the #1 port wing tank, the vapor space of the tank was profiled and compared to the untreated #1 starboard wing tank. When the ullage in the tank was 16 feet, a second application of two liters of the vapor retardant mixture was applied to the crude in the #1 port wing tank. In this application the oil surface was more accessible to the vapor retardant composition and was applied from the deck through the tank openings by means of a garden type spray can. A moderately coarse spray was utilized to obtain maximum trajectory. The tanks were 30 feet by 100 feet by 59 feet deep.

Figure 6:
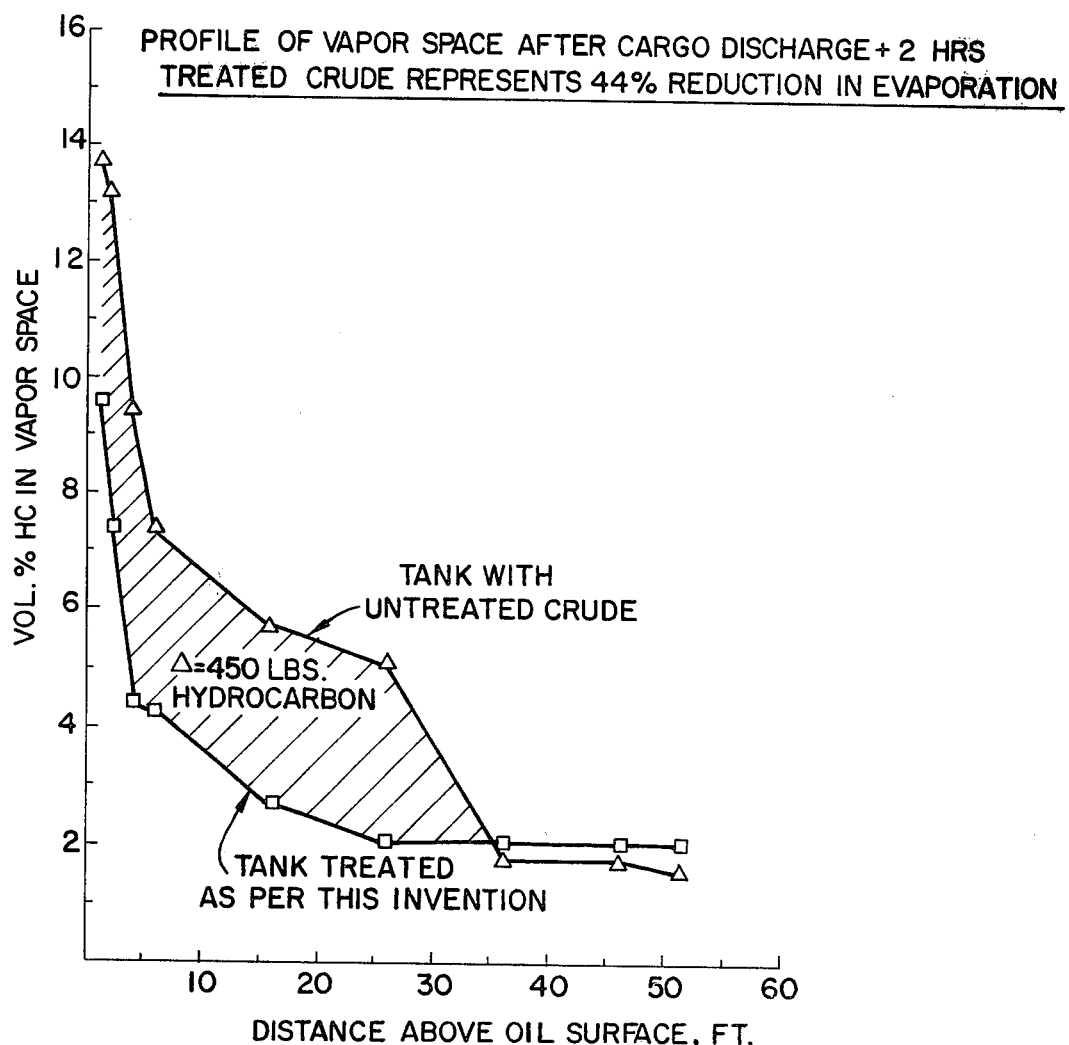
FIG. 6 is a graphic representation of the profile of vapor space of an untreated tank of a commercial tanker during discharge and a tank treated in accordance with this invention.

As the discharge of both tanks continued, additional vapor space profiles were obtained. The monitoring of the hydrocarbon concentration in the tank was continued for two hours after the compartments were completely empty and ready to receive ballast. The profile of the tank compared with the appropriate control is depicted in FIG. 6. It is interesting to note that the suppression of hydrocarbon vapor loss from the oil clingage on tank bulkheads and bottoms was still evident two hours after the compartment was emptied as shown in FIG. 6. This figure illustrates that there was a reduction of 450 pounds of hydrocarbon in the tank treated with the composition of this invention. This represents a significant reduction in the total hydrocarbon vented to the atmosphere when the tank was ballasted.

What is claimed is:

1. An evaporation retarding composition capable of forming a continuous stable film over the surface of a liquid hydrocarbon body, said composition comprising: a fluorosurfactant which is insoluble in the liquid hydrocarbon body and which has a linear fluorocarbon moiety containing from about 7 to about 16 carbon atoms, a silicone surfactant selected from the group consisting of alkyl, aryl and aralkyl polysiloxanes and copolymers of alkyl, aryl and aralkyl polysiloxanes with polyethers having linear aliphatic groups of from 4 to 6 carbon atoms, a polyglycol and a glycol ether, said polyglycol being selected from dihydroxy derivatives of linear aliphatic hydrocarbons having a molecular weight of from about 100 to about 1200 and said glycol ether being selected from alkoxy alkanes having from 6 to 10 carbon atoms, said fluorosurfactant and said silicone surfactant representing between about 10 wt. % and about 40 wt. % of said mixture.

2. The composition of claim 1 wherein said silicone surfactant is a copolymer of a polysiloxane having from 1 to 4 carbon atoms in a linear aliphatic group with a copolymer of ethylene and propylene oxide.

3. The composition of claim 1 wherein the polyglycol is polyethylene glycol having a molecular weight of 400.

4. The composition of claim 3 wherein the glycol ether is selected from alkoxy alkanes having from 6 to 10 carbon atoms.

5. The composition of claim 4 wherein said fluorosurfactant is present in the range of from about 5 wt. % to about 20 wt. %, said silicone surfactant is present in the range of from about 5 wt. % to about 10 wt. %, said polyglycol is present in the range of from about 5 wt. % to about 35 wt. %, and said glycol ether is present in the range of from about 5 wt. % to about 35 wt. %.

6. A hydrocarbon evaporation retarding composition comprising:

from about 5 wt. % to about 20 wt. % fluorosurfactant which is insoluble in the liquid hydrocarbon body and which has a linear fluorocarbon moiety containing from about 7 to about 16 carbon atoms;

from about 5 wt. % to about 10 wt. % silicone surfactant, said silicone surfactant being selected from the group consisting of alkyl, aryl and aralkyl polysiloxanes and copolymers of alkyl, aryl and aralkyl polysiloxanes with polyethers having linear aliphatic groups of from 4 to 6 carbon atoms;

from about 5 wt. % to about 35 wt. % polyglycol, said polyglycol being selected from dihydroxy derivatives of linear aliphatic hydrocarbons having a molecular weight of from about 100 to about 1200; and from about 5 wt. % to about 35 wt. % polyether, said polyether being selected from alkoxy alkanes having from 6 to 10 carbon atoms.

7. The composition of claim 6 wherein the fluorosurfactant has linear fluorocarbon moieties of from 8 to 16 carbon atoms.

8. The composition of claim 7 wherein the fluorosurfactant has the general formula $$NH_4^+ \text{-}(F_3CCF_2CF_2\text{)}_3COO^-$$

and has a gram molecular weight of about 550.

9. The composition of claim 8 wherein said silicone surfactant is a copolymer of a polysiloxane having from 1 to 4 carbon atoms in a linear aliphatic group with a copolymer of ethylene and propylene oxide.

10. The composition of claim 9 wherein the polyglycol is polyethylene glycol having a molecular weight of 400.

11. In the method of suppressing evaporation from a body of liquid hydrocarbons by applying a vapor retarding mixture in an amount sufficient to provide a continuous thin film, the improvement wherein said vapor retardant mixture applied to said hydrocarbon comprises:

from about 5 wt. % to about 20 wt. % fluorosurfactant which is insoluble in the liquid hydrocarbon body and which has a linear fluorocarbon moiety containing from about 7 to about 16 carbon atoms;

from about 5 wt. % to about 10 wt. % silicone surfactant, said silicone surfactant being selected from the group consisting of alkyl, aryl and aralkyl polysiloxanes and copolymers of alkyl, aryl and aralkyl polysiloxanes with polyethers having linear aliphatic groups of from 4 to 6 carbon atoms;

from about 5 wt. % to about 35 wt. % polyglycol, said polyglycol being selected from dihydroxy derivatives of linear aliphatic hydrocarbons having a molecular weight of from about 100 to about 1200; and from about 5 wt. % to about 35 wt. % polyether, said polyether being selected from alkoxy alkanes having from 6 to 10 carbon atoms.

12. The composition of claim 8 wherein said fluorosurfactant has the general formula $$NH_4^+ \text{-}(F_3CCF_2CF_2\text{)}_3COO^-$$

and has a gram molecular weight of 550; wherein said silicone surfactant is a copolymer of dimethyl polysiloxane and polyethylene oxide-polypropylene oxide copolymer; wherein said polyglycol is polyethylene glycol having a molecular weight of about 400; wherein said glycol ether is a 1-hydroxy-2-alkoxy ethane.

* * * * *